United States Patent Office.

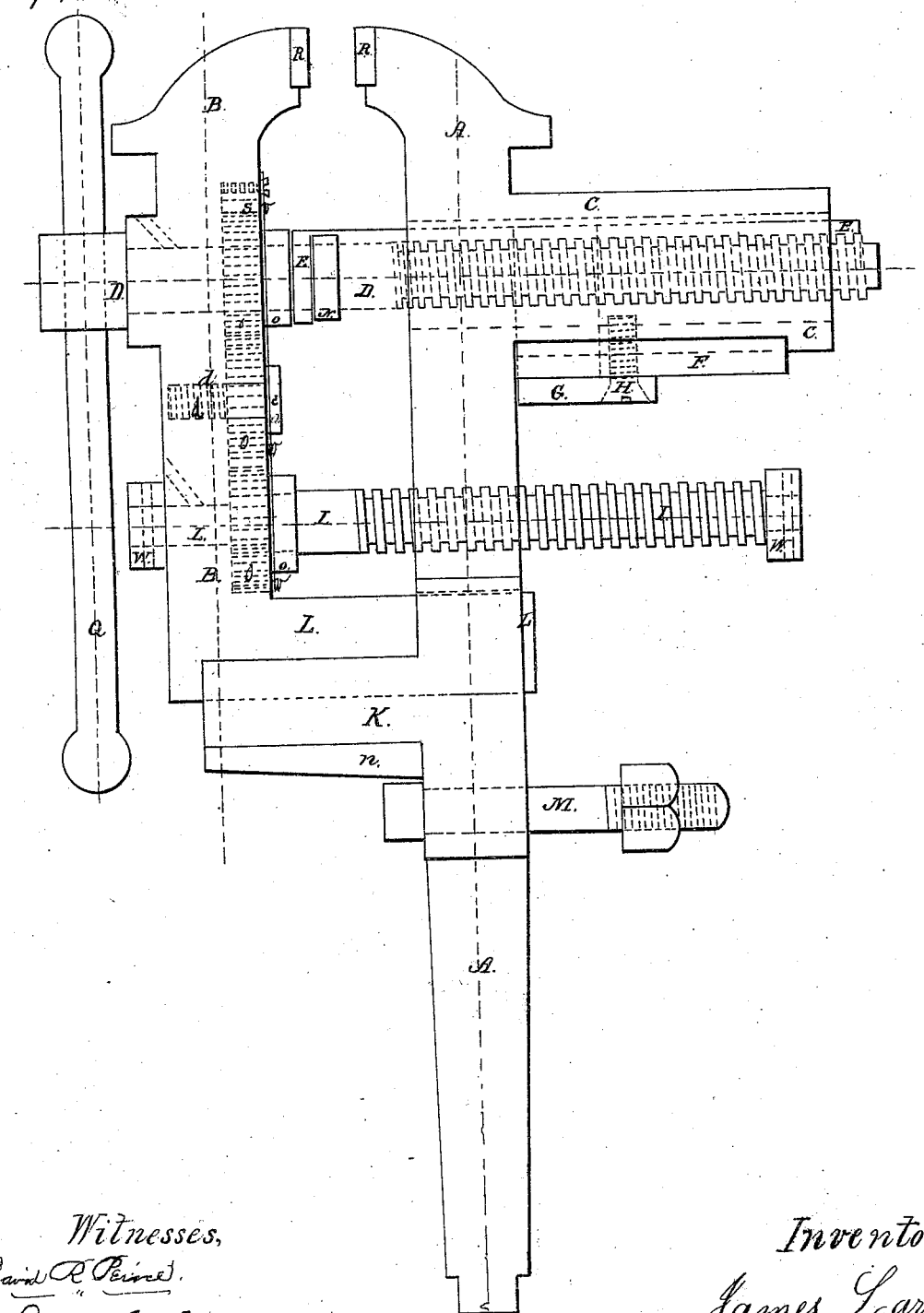

JAMES LARKIN, OF DETROIT, MICHIGAN.

Letters Patent No. 93,454, dated August 10, 1869.

IMPROVED VISE.

The Schedule referred to in these Letters Patent and making part of the same.

*To all whom it may concern:*

Be it known that I, JAMES LARKIN, of Detroit, in the county of Wayne, and State of Michigan, have invented new and useful Improvements in Vises; and I do hereby declare that the following is a full and exact description of the construction and operation of the same, reference being had to the accompanying drawings, making a part of this specification.

I construct my vise as shown on the drawings.

The part A represents the main or stationary jaw and shank of the vise.

The part B represents the movable jaw.

The part C represents a tube or pipe, which is cast on the back of the jaw A, large enough in bore for the main screw D and screw-cover E to pass through, and long enough to protect the screw from anything falling on it.

The part F is a flat plate, which is also cast on the back of the jaw A, under and joined to the pipe C, wide and long enough to be bolted firm to the bench.

The part G is a nut, which I fit into the pipe C from under, and through the plate F, suitable for the main screw D, which the vise is worked by.

I fasten the nut G in its place by means of a taper-headed screw, lettered H, which I screw into the plate F, through a hole in a part of the nut G, which is constructed for that purpose.

The part I is a stay or bracing-screw, made to revolve by means of the spur-pinions o, which are put on tight, one on the screw D, and another on the screw I, and a third, as intermediate, revolving loose on the stud P.

The working of the said pinions, being the same size, and the screws being the same pitch, causes the jaw B to work backward and forward parallel.

The part K represents a piece or way, cast on and at right angles to the jaw and shank A.

The part L represents a piece cast on and at right angles to the jaw B, and fitted to slide between two flanges on the way K, and also through a slot in the shank A.

The part u is a web, cast under the way K, to strengthen it.

The part M is a bolt let through a hole in the shank A, to bolt it steady to the bench, and also as a support under the way K, which the jaw B partly rests upon.

The part S represents a chamber in a part of the jaw B, suitable for the pinions o to fit into, in order to cover them on the outside, to prevent any chips from falling between them.

The part T represents the step end of the screw I, which is fitted with a square shoulder, to rest against the jaw B, in order to be a stay against it.

I also have a collar on each end of the screw I, if I consider it necessary.

The parts R represent steel faces, which I put on and make fast to the jaws A and B.

The part Q is the handle, which the main screw D is turned by.

E represents a circular part on the end of the screw-cover, which is bored to fit loose over the screw D. The remaining part of the screw-cover E is a segment.

N represents a collar, which I fit tight on the screw D, inside, and close to the end of the screw-cover E.

The pinion o also being tight on the screw D, outside, and close to the end of the screw-cover E, causes it to travel backward and forward with and over the screw D, through the pipe C, over and resting on the nut G, protecting the main screw D from anything falling on it.

If I think it best, I can have a left-hand thread on the screw I, and only use two pinions, instead of three.

This vise is so adapted that I can cut it into three different lengths, as shown by the stripes on the shank A, the small size extending only to the first stripe, not embracing the slide or way, a larger size, extending to the lower stripe, embracing both slide and way, and the larger one still, embracing all, with the shank A the full length, extending to the floor.

I wish to mention that a thin plate, by which the pinions o are covered, is shown, lettered v, and, as shown, fastened, by means of screws, to the jaw B, outside of the pinions. Also the collars on the ends of the screw I, lettered W, are put on, one to prevent the screws from being unscrewed out of the nuts, and the other to tend to move the jaw B forward square and steady.

For small vises, I bore a hole through the shank A, and cut a thread into it, suitable for the screw I; but for large vises, I fit a separate nut into it for that purpose.

What I claim as my invention, and desire to secure by Letters Patent, is—

1. The construction and arrangement of the jaws A B, actuating-screw D, provided with annular shoulders N O, and the sheath E, formed with a circular collar at one end, all fitted together substantially as described.

2. The combination of the screws D I, operated as described, to maintain the parallelism of the jaws, with the sheath v, for turning off chips, dirt, and refuse and falling material, as set forth.

JAMES LARKIN.

Witnesses:
 DAVID R. PEIRCE,
 JAMES W. BARTLETT.